Jan. 21, 1964    G. H. BACHELET ETAL    3,118,711
BEARING RETAINING SLEEVE
Filed May 22, 1961    2 Sheets-Sheet 1

INVENTORS
GILBERT BACHELET
DÉSIRÉ BRUIET
By Irwin S. Thompson
ATTY.

Jan. 21, 1964   G. H. BACHELET ETAL   3,118,711
BEARING RETAINING SLEEVE

Filed May 22, 1961   2 Sheets-Sheet 2

INVENTORS
GILBERT BACHELET
DÉSIRÉ BRUIET
BY Irwin S. Thompson
ATTY.

United States Patent Office 3,118,711
Patented Jan. 21, 1964

3,118,711
BEARING RETAINING SLEEVE
Gilbert H. Bachelet and Désiré Bruiet, Orly, France,
assignors to Air France, Paris, France
Filed May 22, 1961, Ser. No. 111,672
Claims priority, application France July 11, 1960
3 Claims. (Cl. 308—236)

The present invention relates to ball or roller bearings. As is known, such bearings must be kept rigidly centered or immobilized against any axial forces which may act on them. The method commonly used up to the present for this purpose consists in crimping or flanging a cylindrical bush or sleeve, interposed between the bearing and its support; the desired result, viz. complete immobilisation of the bearing in its support is obtained, but at the cost of two drawbacks:

(a) The need for employing relatively thick, cut away bushes (it being necessary for the crimped or flanged edge to project beyond the edge of the outer bearing race and the edge of the bore of the bearing support), thus involving a relatively high waste of materials and labour and, in some cases, a prohibitive bulk;

(b) The impossibility of replacing a worn bearing by a new one without damaging the bore of the support;

According to the present invention, these drawbacks are eliminated by means of a cylindrical bush or sleeve located between the bearing and its support, end portions of said bush or sleeve extending beyond the bore of the support and being formed with tongues some of which are bent to engage the end faces of the bearing while others are bent to engage the end faces of the support. Preferably, an even number of tongues of equal width are formed, alternate tongues being bent to engage the end faces of the bearing and support respectively. Said tongues are conveniently formed by cutting said end portions along lines parallel to the longitudinal axis of the sleeve.

This arrangement enables the sleeve to be made of thin metal, of lighter weight and more easily manufactured than the conventional, thick bush.

According to a further feature of the invention, the bearing support has, at both ends of its bore, a circular groove, intended to receive a protective disc or washer, conveniently of light-gauge metal, on which the lugs bent back outside the sleeve bear; the presence of this washer, combined with the relative thinness of the lugs makes it possible, when replacing the bearing, to cut through the latter with a light saw or trepan without damaging the support, then simply to force out the bearing by axial pressure, since it is no longer held by the lugs which bore on the disc housed in the groove of the support. By this means, the bore does not suffer any damage and the replacement of worn bearings henceforward becomes an easy operation with no ill effect on the bearing support.

The attached drawing shows an example of the application of the invention to a ball bearing of essentially known type.

Figure 1:
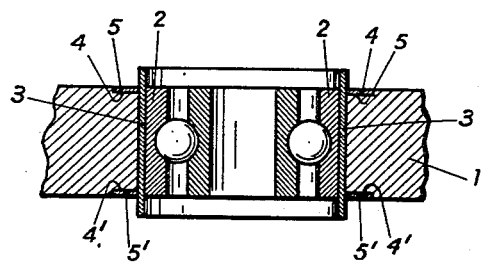
FIG. 1 is an axial section of the ball bearing, set in position, before crimping of the sleeves.

Referring first to FIG. 1, it can be seen that the support 1 and the ball bearing 2 are of conventional type and not in themselves intended to be within the scope of the present invention, but only in association with the sleeve which will now be described.

Figure 2:
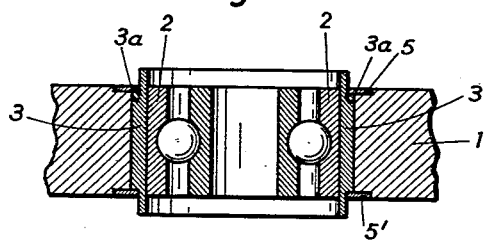
FIG. 2 is a similar section of a variant form.

The cylindrical sleeve 3 of light gauge sheet metal completely surrounds the ball bearing 2 which it separates from the support 1. Its length is slightly greater than that of the bore of the support, in order to permit the cutting and crimping of the alternating lugs which will subsequently be described. FIG. 2 shows a variant form of application of the invention to a support already previously bushed and crimped according to this technique, and the bore of which has had to be enlarged to compensate for damage suffered. The sleeve 3 is in this case provided with a shoulder or rebate 3a to compensate for this increased enlargement of the bore.

In either case, the support has at both ends of its bore a circular groove, 4, 4', forming a seating for a protective disc or washer 5, 5', of thin metal, the purpose of which will be disclosed presently.

Figure 3:
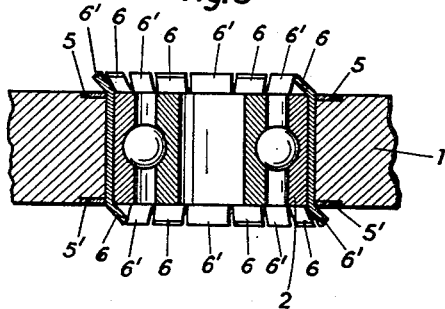
FIG. 3 is an axial section of the ball bearing and the sleeve according to FIG. 1, after the first crimping operation.
Figure 4:
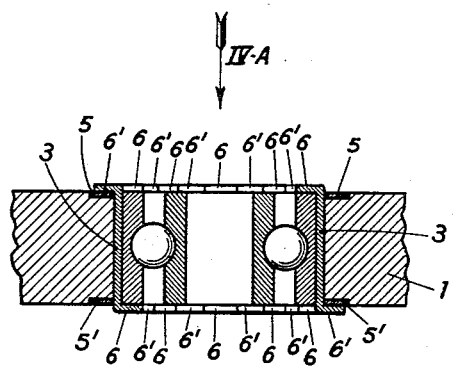
FIG. 4 is an axial section of the ball bearing and its sleeve after the second crimping operation.

FIG. 3 shows how each end part of the sleeve 3, projecting beyond the surface of the washer 5 or 5', is slit axially in such manner as to form indented or crenellated lugs, certain of which, numbered 6, are then bent back inwards over the adjacent face of the bearing itself, while the others, numbered 6', are bent back outwards, i.e. over the washers 5 and 5' respectively; FIGS. 3 and 4 show that these lugs are alternated and that, in a first operation, they are cut and bent (FIG. 3) and then, in a second operation, flanged over on the bearing end face or on one of the two washers (FIG. 4).

The bearing is thus firmly held in place, with no possibility of moving, particularly in the axial direction.

Figure 4A:
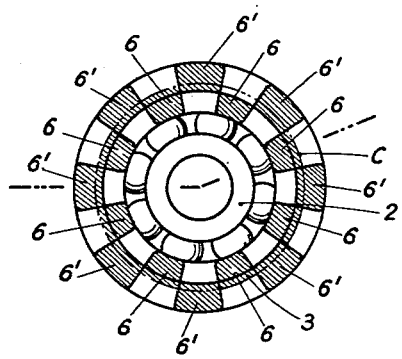
FIG. 4a is an end view in the direction of the arrow IVA in FIG. 4. (The same components bear the same reference numbers in the different figures.)

The removal of the bearing is facilitated both by the thinness of the lugs, and by the fact that only half of these lugs are bent outwards and that the lugs 6' bent outwards are pressed against one or the other of the washers 5 or 5'. This makes it possible by means of a light trepan or saw, to cut off the lugs 6' along the circumference C shown in dot-dash lines in FIG. 4a, and this is done on one side of the bearing only: (in the said FIG. 4a, the area covered by the lugs 6 and 6' is vertically hatched, in the conventional manner, also the cross-section of the sleeve 3): thus the flange holding the ball bearing is eliminated at least on one side, which is sufficient to enable it to be forced out axially by applying pressure; for instance, in the direction of the arrow IVA if the lugs 6' bearing on the washer 5 have been cut off. The presence of this washer protects the support 1 against any damage by the cutting tool and the forcing out of the roller bearing leaves the bore unharmed.

By way of example, the sleeve can be advantageously produced by deep drawing in a press or by extrusion and the washers by stamping out in a press. The crimping of the lugs can be performed with a hand punch using two identical upper and lower heads and a centering pin adjustable to the bore of the roller bearing. In the case in which the roller bearing is of the cap or angle type, preventing the entry of the lower crimping head, the crimping of one end of the sleeve is prepared outside the bearing which is then fitted inside the prepared ring with the supporting washer in its appointed place, after which the assembly is inserted in the bore of the support crimping the second end by means of a single punch.

We claim:

1. An assembly comprising a ball or roller bearing, a support for said bearing, a cylindrical sleeve located between said bearing and said support, end tongues on said sleeve at the ends of the bore of said support, an annular groove formed at each end of said bore, and a washer located in each of said grooves, some of said end tongues engaging end faces of said bearing and others of said end tongues engaging said washers.

2. An assembly according to claim 1, wherein the end tongues on said sleeve are defined by slits in integral extensions of said sleeve at the ends of the bore of said support.

3. An assembly comprising a ball or roller bearing, a support for said bearing, a cylindrical sleeve located between said bearing and said support, end tongues on said sleeve at the ends of the bore of said support, an annular groove formed at each end of said bore, and a washer located in each of said grooves, there being an even number of tongues at each end of said sleeve, alternate tongues engaging the end faces of said bearing and said washers respectively.

References Cited in the file of this patent

UNITED STATES PATENTS

| | | |
|---|---|---|
| 2,814,539 | Borger | Nov. 26, 1957 |
| 2,992,868 | Vacha | July 18, 1961 |

FOREIGN PATENTS

| | | |
|---|---|---|
| 671,313 | Germany | Mar. 2, 1939 |